United States Patent [19]

Shank

[11] 4,197,046
[45] Apr. 8, 1980

[54] PALLETIZER

[75] Inventor: Harvey T. Shank, Papillion, Nebr.

[73] Assignee: Stauffer Chemical Company, Westport, Conn.

[21] Appl. No.: 901,213

[22] Filed: Apr. 28, 1978

[51] Int. Cl.$^2$ .............................................. B65G 57/00
[52] U.S. Cl. .................................... 414/110; 198/419; 198/486; 414/68; 414/226; 414/659; 414/753
[58] Field of Search ..................... 214/6 P, 1 BB, 6 N, 214/6 A, 654, 82; 198/419, 486; 414/43, 68, 110, 226, 751, 753, 659

[56] References Cited

U.S. PATENT DOCUMENTS

| 1,490,898 | 4/1924 | Luce | 214/6 A X |
| 2,560,206 | 7/1951 | Beatty | 214/82 X |

FOREIGN PATENT DOCUMENTS 1179893   5/1959   France ...................... 214/6 A Primary Examiner—Stephen G. Kunin
Assistant Examiner—George F. Abraham
Attorney, Agent, or Firm—Leydig, Voit, Osann, Mayer & Holt, Ltd.

[57] ABSTRACT

A palletizer for picking up a group of stacked cans from a first pick-up position on a conveyor, transporting the cans to a second deposit position and depositing the cans onto a pallet. The stacks of cans are accumulated on the conveyor by an exit gate prior to being picked up. The cans are also aligned on the conveyor by means of a retractable can guide adjacent the conveyor. The palletizer further includes a transport carriage movably mounted on a track of a frame. The carriage includes both a lift mechanism for lifting the cans off of the conveyor and a hold-down mechanism to steady the cans while they are being lifted and transported to the pallet. Finally a push bar unloading mechanism disengages the cans from the lift mechanism and snugs them against the other cans on the pallet.

8 Claims, 12 Drawing Figures

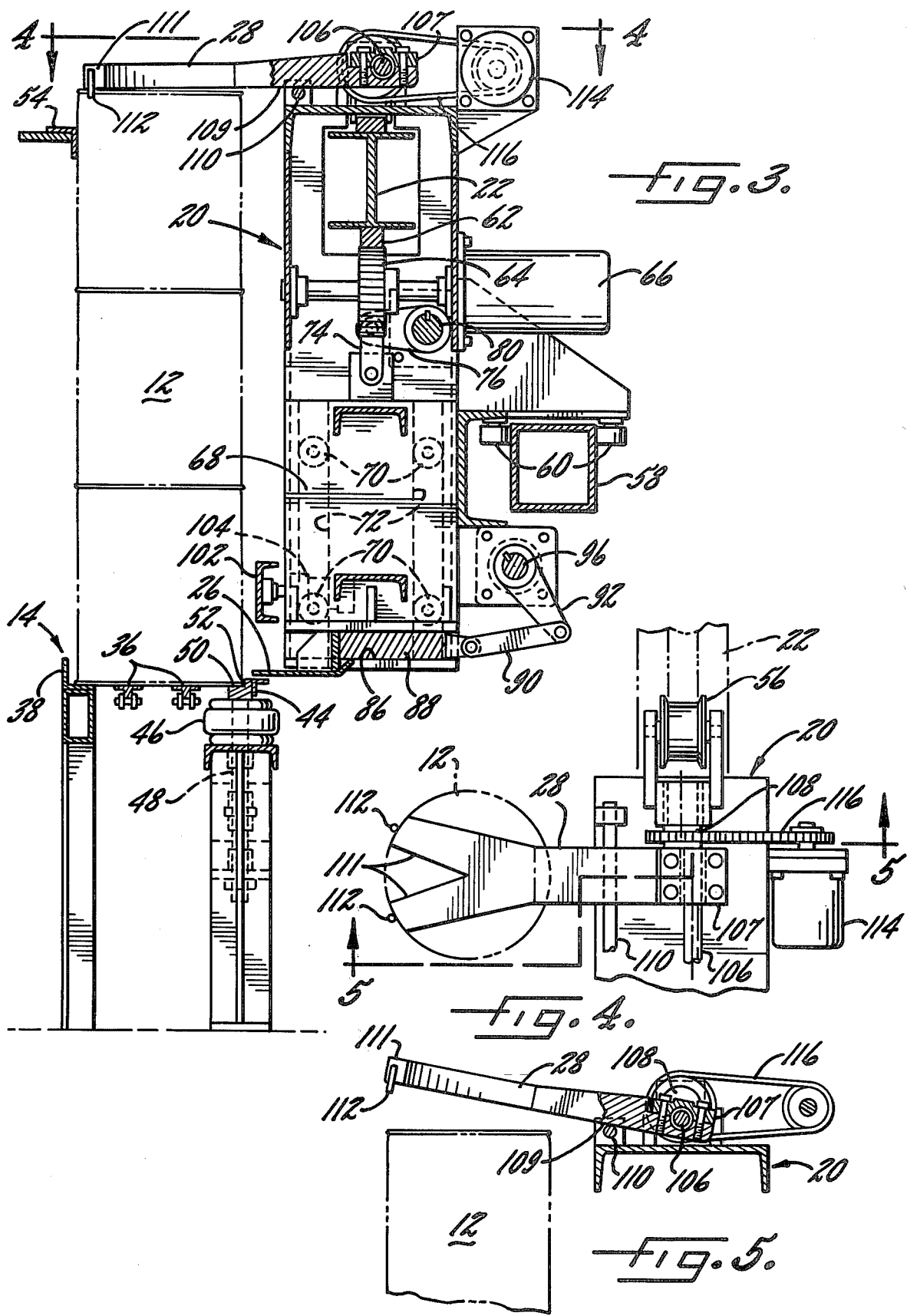

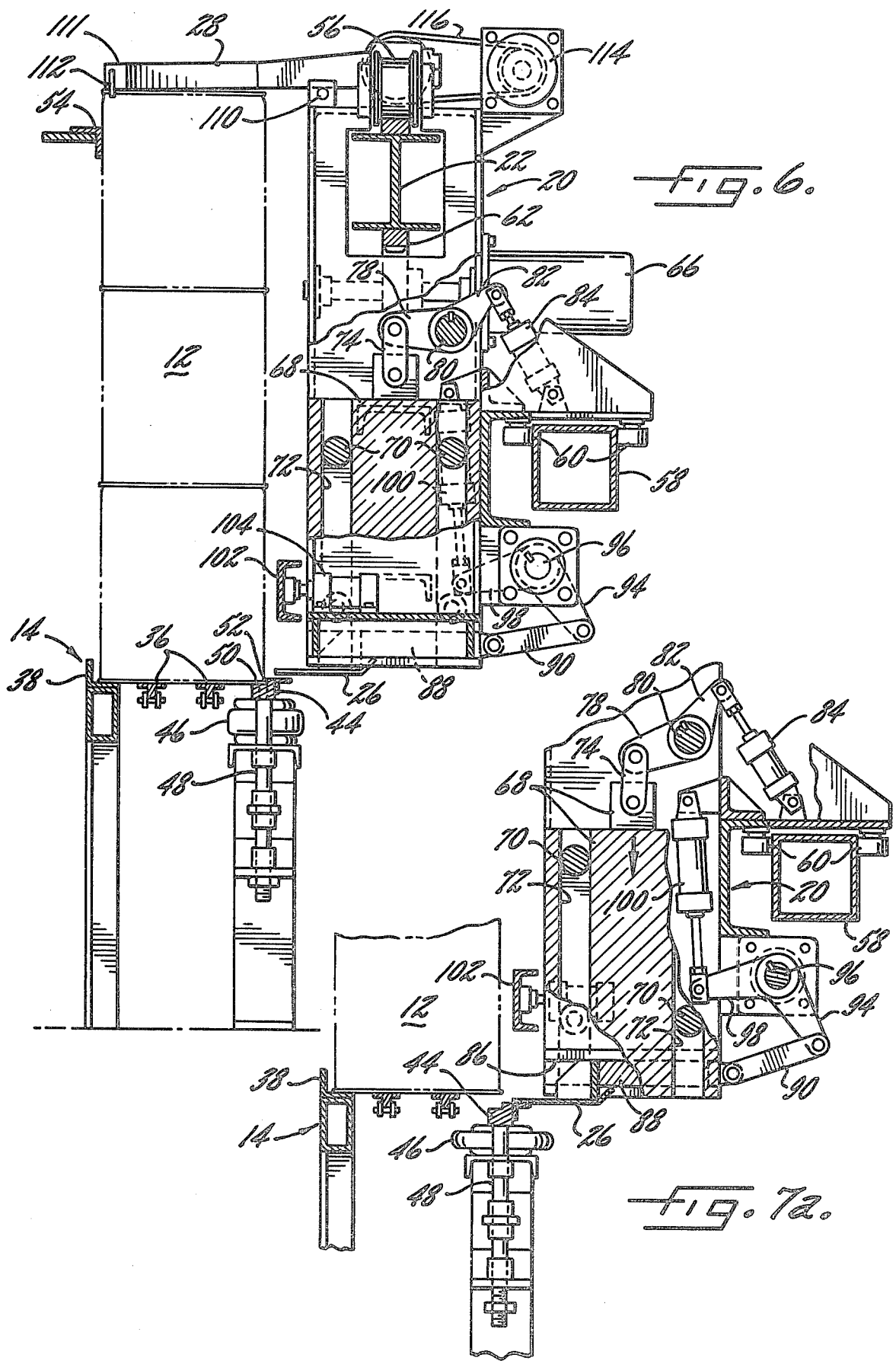

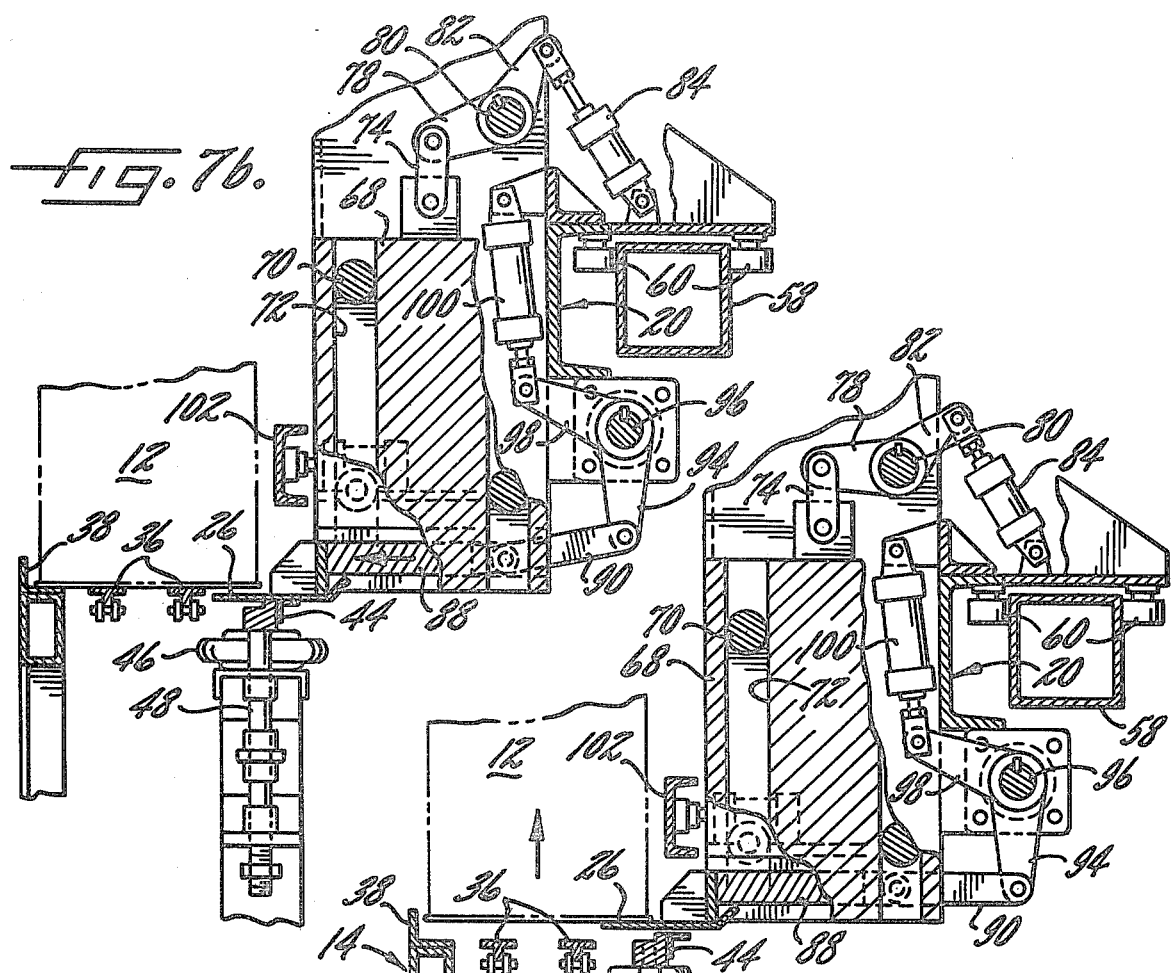
Fig. 7b.
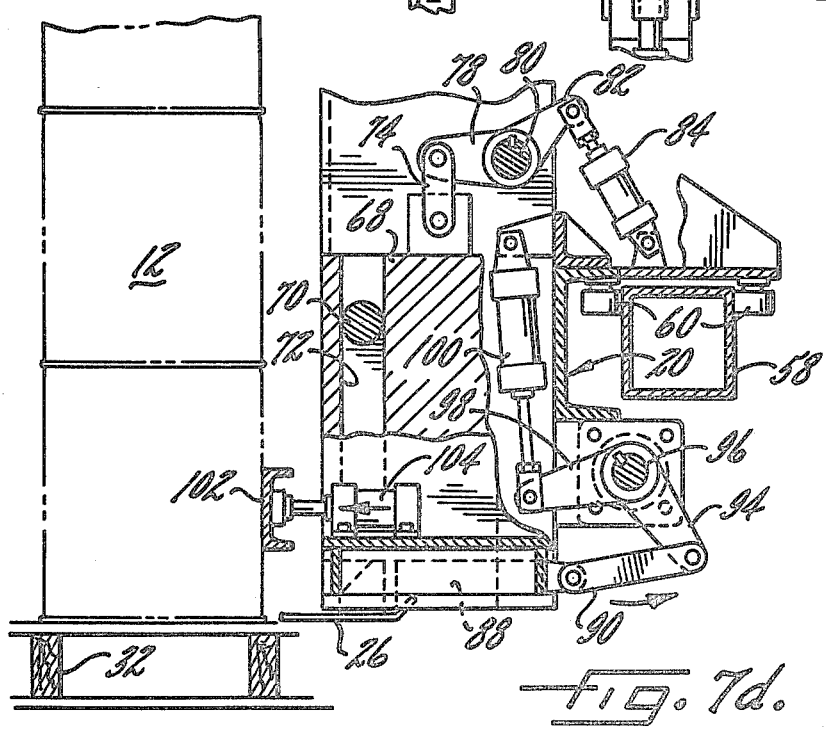
Fig. 7c.
Fig. 7d.

PALLETIZER

BACKGROUND OF THE INVENTION

This invention relates generally to automated handling of drums or cans and more particularly to a palletizer for moving a plurality of stacked cans from a first pick-up position on a conveyor to a second deposit position on a pallet.

Chemical products in liquid form, such as herbicides, insecticides, oil, grease, and other chemicals, are often packaged and sold in five gallon drum containers. The five gallon drum containers or cans are generally cylindrical in shape with a flat top and bottom. A folddown handle is generally provided in the middle of the top of the can and a circular opening for filling and emptying is also provided in the top adjacent the edge of the can.

In an automated process the cans are moved in serial fashion by a can conveyor to a filling station then to a capping station where the cans are sealed. Once the cans have been filled and sealed, the cans are stacked one on top of the other and a group of the stacked cans are then placed on a pallet in order to facilitate the handling of the cans by mechanical means during warehousing and shipping.

The prior art provides a means for stacking cans one on top of the other, generally three in height, as the cans come from the capping station. Once the cans have been stacked three high on the conveyor, some means must be provided for accumulating a group of the stacked cans and transferring them from the conveyor to the pallet on which they will ultimately be stored and handled.

The problem of picking up a group of stacked cans from a conveyor and transferring them to a pallet is complicated by the weight of the filled cans, the variation in height of the individual cans and the unevenness or skew of the flat tops and bottoms of the individual cans. For example, if the bottoms and tops of the cans are skewed, the three stacked cans may tend to be somewhat unstable and tip when picked up from the conveyor by any mechanical means. The possibility of a five gallon can weighing 40 lbs. or more toppling from a conveyor or a palletizer presents an extremely hazardous situation in the handling of these cans. This hazard is greatly increased when the cans are filled with toxic or flammable fluids which may be released if the cans fall and are ruptured.

It is also desirable in putting five gallon cans onto a pallet to provide for either straight stacking, i.e. each row on the pallet contains the same number of cans or for staggered stacking, i.e. every other row contains one less can than the adjacent row so that the cans nestle into the intervening space between the adjacent rows.

It is therefore an object of the present invention to provide a palletizer which can accumulate a number of stacks of cans on a can conveyor, lift those cans from the conveyor in a steady and stable fashion, transport the cans from the conveyor to a pallet and deposit the cans onto the pallet.

Collaterally then, it is an object of the present invention to provide a palletizer having carriage means mounted on a frame which moves between a first pick-up position adjacent the can conveyor to a second deposit position adjacent the pallet.

More particularly, it is an object of the present invention to provide carriage means which includes lift means and hold-down means which together cooperate to lift the cans from the conveyor while simultaneously holding them firmly so as to eliminate the risk of the stacked cans toppling while the carriage means moves from the first pick-up position to the second deposit position.

It is also an object of the present invention to provide unloading means on the carriage means which when the carriage means is adjacent the pallet, the unloading means serves to push the cans off of lift means and to snug the cans against the other cans on the pallet.

It is further an object of the invention to provide can guide means adjacent to the conveyor to align the cans on the conveyor prior to the lift means engaging the cans at the first pick-up position to assure adequate engagement of the cans by the lift means.

It is further an object of the present invention to provide hold-down means that will engage the can tops so as to pull them toward the carriage means thereby assuring stability.

It is also an object of the present invention to provide accumulator means having a counter which controls the number of stacks of cans accumulated so that staggered stacking on the pallet can be accomplished.

Other objects and advantages of the invention will become apparent upon reading the following detailed description and upon reference to the drawings, in which:

FIGS. 1a, 1b, and 1c are perspective views of the palletizer of the present invention with FIG. 1a showing the palletizer in its first pick-up position while stacks of cans are being accumulated, FIG. 1b showing the palletizer with a plurality of stacks of cans being lifted prior to transporting them to a pallet and FIG. 1c showing the palletizer in its deposit position having deposited the stacks of cans onto a pallet;

FIG. 3 is a sectional view of the palletizer taken along line 3—3 of FIG. 2, including the can conveyor;

FIG. 4 is a sectional view of the hold-down means taken along line 4—4 of FIG. 3;

FIG. 5 is a sectional view of the hold-down means of the palletizer taken along line 5—5 of FIG. 4;

FIG. 6 is a sectional view of the palletizer taken along line 6—6 of FIG. 2; and FIGS. 5, 7a-7d details the lift means showing four different operating positions of the lift means in FIGS. 7a, 7b, 7c and 7d.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figures 1A, 1B, 1C:
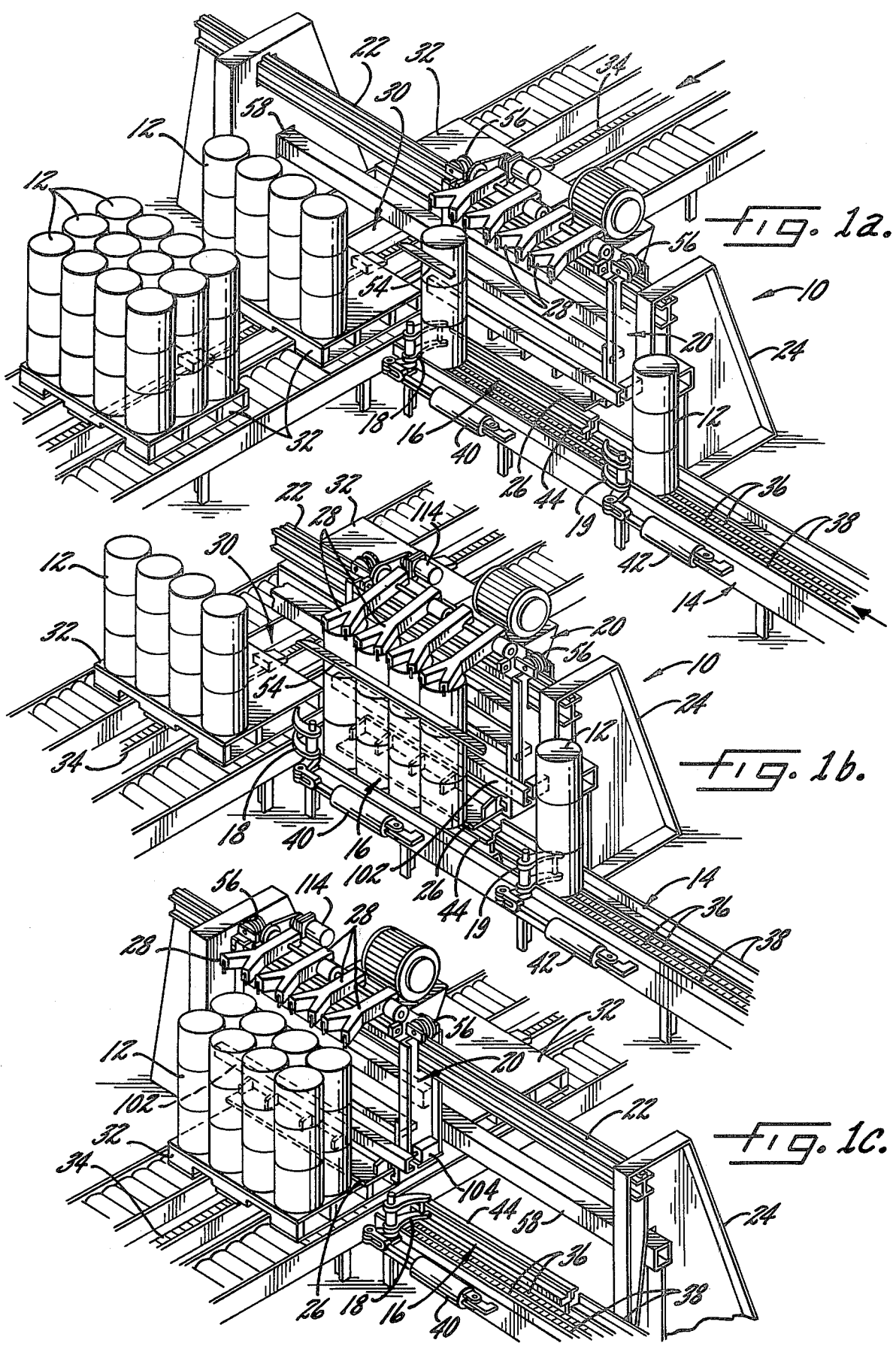

Turning to FIG. 1, a palletizer 10, which is part of an automated system for handling five gallon drums or cans 12, receives stacks of cans in spaced, serial fashion on a can conveyor 14 and accumulates a number of stacks of cans at a pick-up position 16 by means of an accumulator which includes an exit gate 18 and an entrance gate 19 (FIG. 1a). After a predetermined number of stacks of cans has been accumulated, entrance gate 19 closes to preclude further stacks of cans from entering the pick-up position, and a pick-up sequence is initiated to pick up the stacks of cans. The stacks of cans are picked up by a carriage 20, movably mounted on a rail 22 of a frame 24, which carriage has lift means including a lift plate 26 for lifting the stacks of cans and hold-down means including hold-down bars 28 for steadying the stacks of cans (FIG. 1b). After the carriage has picked up the stacks of cans, exit gate 18 opens, and the carriage transports the stacks of cans to a deposit position 30 adjacent a pallet 32. Having reached deposit position 30, a deposit sequence begins, and the carriage 20 deposits the stacks of cans onto the pallet 32 (FIG. 1c). After depositing the stacks of cans onto the pallet, the carriage returns to the pick-up position to begin the palletizing sequence again. Finally, after the carriage has returned to the pick-up position 16, the pallet is indexed forward (right to left in FIG. 1).

As can be seen in FIG. 1a, stacks of cans 12 are delivered to the palletizer by can conveyor 14. The can conveyor 14 consists of a double row of smooth-topped conveyor chains 36 and side guides 38. In order to accumulate a number of stacks of cans, the exit gate 18 at the end of the conveyor 14 is closed by means of cylinder 40 being extended as shown in FIG. 1a. On the other hand, entrance gate 19 is opened by means of cylinder 42 being retracted to allow stacks of cans to be conveyed into pick-up position 16 (FIG. 1a).

When a stack of cans reaches closed exit gate 18 as shown in FIG. 1a, the exit gate blocks the stack from proceeding further. The smooth-topped conveyor chains 36 merely slip underneath the stack of cans while the stack remains blocked by exit gate 18. The next stack of cans entering the pick-up position 16 comes in contact with the previous stack of cans and the smooth-topped conveyor chains 36 slip underneath it. In order to efficiently run the accumulator, it is necessary to have a low coefficient of friction between the smooth-topped conveyor chains 36 and the bottoms of the cans.

The accumulating sequence continues until the proper number of stacks has been accumulated. In order to determine that the proper number of stacks of cans has been accumulated (four stacks for example in FIG. 1), limit switches (not shown) are mounted along the conveyor 14 adjacent the pick-up position. For example, in order to accumulate four stacks of cans, the maximum number of stacks provided in the illustrative embodiment of FIG. 1, four limit switches would be provided spaced along the conveyor 14 at the pick-up position 16. When all four stacks of cans have been accumulated, each of the limit switches will have been activated, which in turn informs machine control that four stacks have been accumulated and that the palletizer is ready to pick up the four stacks.

The machine control is of conventional design and may be implemented either by electrical or pneumatic logic elements (depending on the machine environment) to carry out the operating sequence described in the specification. As would be obvious to one having ordinary skill in the art, the machine control could be altered for the illustrative embodiment so that with only three of the four limit switches tripped, the pick-up sequence could begin. By properly programming the limit switches, the palletizer can be used to stack first a group of four stacks of cans followed by a group of three stacks of cans then followed by another group of four stacks of cans. In that manner, the cans can be stacked on the pallet in a staggered order so that the cans nestle into the spaces between each other.

When the proper number of stacks of cans has been accumulated by means of closed exit gate 18, and when the limit switches have signalled the machine control that the pick-up sequence is ready to begin, entrance gate 19 is closed by means of cylinder 42 extending so that no further stacks of cans can enter the pick-up position 16 (FIG. 1b).

Also in order to accumulate stacks of cans prior to them being picked up by the carriage 20, it is important that the lower edges of the cans be aligned parallel to and spaced from the lift plate 26. In order to achieve alignment of the cans, a retractable can guide 44 is mounted on sliding shafts 48 adjacent to pick-up position 16 (FIG. 1a). The can guide 44 extends parallel to the conveyor chains 36 and the lift plate 26 and provides a retractable extension of inner side guide 38.

Figure 2:
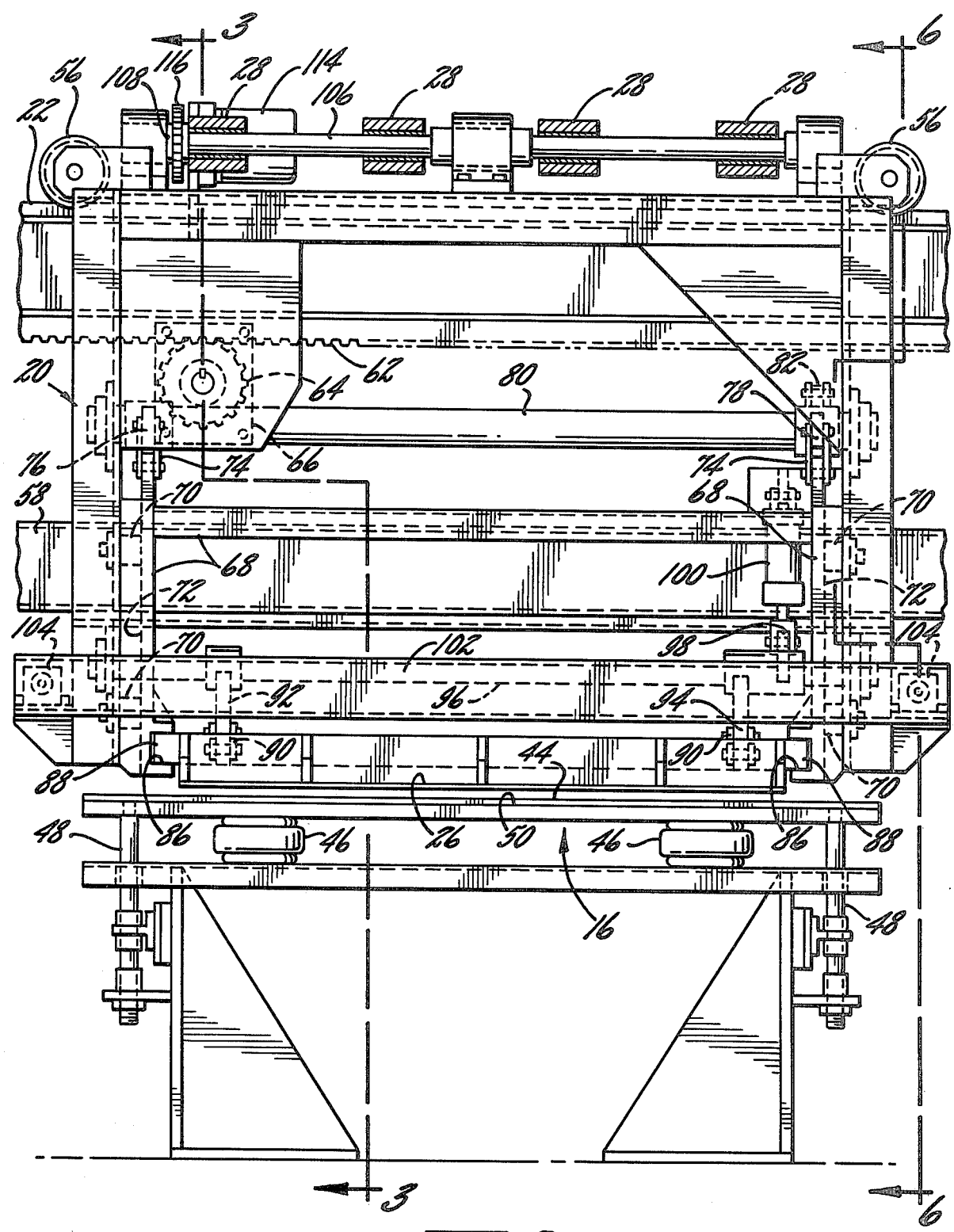
FIG. 2 is a partial elevation view of the palletizer with the can conveyor removed in order to show details of the carriage of the palletizer.

As can be more clearly seen in FIGS. 2 and 3, the can guide 44 is an elongated bar which is mounted on two pneumatic actuators 46 with its freedom of movement controlled by sliding shafts 48. The sliding shafts 48 simply restrict the freedom and extent of the vertical movement of the can guide 44. The actuators 46 are pneumatically controlled donut actuators which, when inflated, cause the can guide to rise upward and when deflated allow the can guide to retract downward.

As can best be seen in FIG. 3, the can guide 44 in its extended position (in its up position) provides a horizontal bearing surface 50 which helps to stabilize the cans on conveyor chains 36. The pneumatic actuators provide a cushioning equalizing effect so that the can guide 44, while providing a horizontal bearing surface, does not serve to lift the cans off of conveyor chains 36. The can guide 44 also provides a vertical bearing surface 52 which in conjunction with outside side rail 38 assures that the cans are positioned parallel to and spaced from the lift plate 26 so that the pick-up mechanism can be assured of reliably engaging a portion of the bottom of each can to provide sufficient support in order to lift the can. Also, the cans must be spaced from the retracted lift plate so when the carriage returns from the deposit position the cans will not be hit by the edge of the lift plate.

Also, a balancing guide 54 is provided at the pick-up position 16 to assure that the cans while being accumulated do not topple from the conveyor before the lift means and hold-down means have had a chance to engage the cans.

In order to transport the stacks of cans from the can conveyor 14 to the pallet 32, carriage 20 is mounted on support rail or track 22 by means of rollers 56 (FIGS. 2 and 3). A balancing rail 58 is also provided and is engaged by means of rollers 60 mounted on carriage 20 to assure that when the carriage has picked up the twelve cans (weighing as much as four hundred pounds) that the carriage does not tip forward on the rail 22.

Rail 22 has mounted on its lower side of gear rack 62 which is engaged by a pinion gear 64. The pinion gear 64 is driven by hydraulic motor 66 which when activated causes the carriage to be driven along the rail 22 from the pick-up position to the deposit position and then back. While the preferred embodiment shows the use of the hydraulic motor, pinion gear, and gear rack as a means for moving the carriage between the pick-up position and the deposit position, a two-way hydraulic cylinder could be used as well to push the carriage toward the deposit position and then pull it back to the pick-up position.

Again as can best be seen in FIGS. 2, 3 and 6, carriage 20 includes lift means comprising lift frame 68 and lift plate 26. The lift frame 68 and the lift plate 26 respectively provide horizontal and vertical movement for engaging and lifting the cans.

The lift frame 68 is mounted in carriage 20 by means of eight rollers 70 (four at either end of the carriage) which are journalled into the carriage itself and which then engage vertical slots 72—two at each end of the lift frame. As can best be seen in FIGS. 2 and 6, the lift frame is moved up and down by means of links 74 attached to each end of the lift frame. The links 74 are in turn attached to two cranks 76 and 78 which are both keyed to lift frame shaft 80. Crank 78 also has an additional crank arm 82 which is fixed to crank 78 and is connected to cylinder 84. When cylinder 84 is extended, crank 82 causes lift frame shaft 80 to rotate counterclockwise (FIG. 6), and the lift means is lowered (FIG. 7b). When the cylinder 84 is retracted, crank 82 causes lift frame shaft 80 to rotate clockwise (FIG. 6), and the lift frame is raised (FIG. 6).

The lift frame 68 has horizontal slide channels 86 in each of its lower ends (FIGS. 2 and 3). The slide channels 86 engage complementary elongated block members 88 which are rigidly attached to lift plate 26. The slide channels 86 and the elongated block members 88 provide means for restricting the relative movement between the lift plate and the lift frame to the horizontal direction. The lift plate 26 is moved in the horizontal direction within the block and slide configuration by means of links 90 attached at each end of the lift plate. The links 90 are in turn attached to crank arms 92 and 94, both of which are keyed to lift plate shaft 96. Crank arm 94 further has additional crank arm 98 which is in turn attached to cylinder 100 (FIG. 6). As can best be seen in FIGS. 6 and 7b when cylinder 100 is extended, the lift plate is retracted (FIG. 6), and when cylinder 100 is retracted, the lift plate is extended (FIG. 7b).

FIGS. 6, 7a, 7b and 7c show a complete sequence of how the lift frame and lift plate interact with each other and how the lift plate interacts with the can guide 44 in order to pick up a stack of cans from conveyor 14. FIG. 6 shows the palletizer in its initial position before the lift means has started its pick-up operation. In FIG. 6 the lift frame 68 is shown in its raised position which is maintained by cylinder 84 being retracted. The lift plate 26 is in its retracted position with cylinder 100 extended. The can guide 44 is in its raised position so that the edge of the cans bear against both its horizontal bearing surface 50 and its vertical bearing surface 52.

FIG. 7a shows the next step in the pick-up sequence in which the cylinder 84 is extended with a power stroke in order to force the lift frame downward thereby carrying the lift plate 26 downward with it. Simultaneously, the air actuators 46 are deflated so that the can guide 44 can be pushed downward by means of the lift plate 26 riding on top of the can guide.

FIG. 7b shows the next step in the pick-up sequence in which cylinder 100 is retracted so that lift plate 26 is extended horizontally underneath the edge of the cans in preparation for the lifting of the cans.

FIG. 7c shows the last step in the pick-up process in which cylinder 84 is retracted thereby raising lift frame 68 along with the lift plate 26 so that the stack of cans is picked up on the bottom edge of the can by means of the lift plate 26. Simultaneously, the can guide 44 is raised by means of actuators 46.

The carriage also includes pushbar 102 which is mounted at each of its ends by means of identical cylinders 104. FIG. 6 shows the pushbar in its retracted position. By activating the two cylinders 104 simultaneously, the pushbar 102 can be extended so as to engage the cans and slide them off of the lift plate (FIG. 7d). The pushbar thus operated is used in the unloading sequence of the palletizer and its function and advantages will be more clearly set out below.

In addition to the lift means carried by the carriage 20, the carriage 20 also includes hold-down means which includes hold-down bars 28. In the embodiment shown in FIG. 1 which illustrates a four stack palletizer, there are four hold-down bars 28—one for each stack of cans that is being lifted. The hold-down bars are mounted so that while the cans are being accumulated, the hold-down bars 28 are in their raised position (FIGS. 1a and 5). When the cans have been accumulated at the pick-up position 16 and when the pick-up sequence has been initiated, the hold-down bars are lowered onto the top of each stack of cans in order to hold the cans down and to pull them back toward the carriage. In that manner the stacks of cans are stabilized as they are transported to the deposit position so that unevenness or skew in the cans' tops does not result in the stacks toppling.

In order to provide the operating sequence for the hold-down bars 28, and with reference to FIGS. 3, 4 and 5, one end 107 of each hold-down bar 28 is journalled into eccentric shaft 106 which forms the eccentric portion of crankshaft 108. The crankshaft 108 is driven by means of an hydraulic motor 114, connected to the crankshaft 108 by a sprocket and chain drive 116. A center portion 109 of hold-down bar 28 rests on loose fulcrum bar 110. The loose fulcrum allows the hold-down bar 28 to pivot on, to slide on and to raise from the fulcrum shaft 110. The can gripping end 111 of hold-down bar 28 has fingers 112 which engage the outer rim of the uppermost can of the stack when the hold-down bar is lowered onto the top of the stack of cans. The fingers provide a bearing surface for pulling the cans toward the carriage 20 to assure that the cans cannot topple.

FIG. 5 shows the hold-down bar in its up position—the position of the hold-down bar while the cans are being accumulated. Once the cans have been accumulated, the motor 114 causes the crankshaft to rotate clockwise (starting at approximately 8 o'clock, as shown in FIG. 5). As crankshaft 108 rotates clockwise (from 8 o'clock to 12 o'clock), the can gripping end 111 of the hold-down bar moves outward and then downward. Finally the can gripping end 111 moves backward as the eccentric continues rotating (12 o'clock to 4 o'clock). In all, the eccentric crankshaft rotates approximately 200°.

Because the fulcrum rod 110 is not attached to the hold-down bar 28, the hold-down bar can slide forward and backward on the fulcrum to grip and pull the stacks backward. Also, if the can stack is higher than expected because of variations in individual can's height, the hold-down bar can lift off of the fulcrum 110 when the hold-down bar is down in order to accommodate the high stack. The weight of the hold-down bars themselves provides the sufficient hold-down force so that the fulcrum need not be attached in order to provide sufficient hold-down force. Furthermore, pulling the cans backward toward the carriage provides a second important stabilizing effect.

Having described the construction of the palletizer and the operation of various portions of the palletizer, the overall operating sequence of the palletizer will now be described. With reference to FIG. 1a which shows the initial state for the palletizer, the carriage 20 is positioned at the pick-up position 16. Entrance gate 19 is opened to allow stacks of cans on conveyor 14 to enter pick-up position 16. Also initially, exit gate 18 is closed in order to block stacks of cans from passing beyond the end of conveyor 14. As each stack of cans enters pick-up position 16 they are held by exit gate 18, and the smooth-topped conveyor chains 36 simply slip along beneath the bottom of the stacks of cans while the accumulation process continues. Each stack of cans when it reaches its position in the pick-up position 16 activates one of four limit switches (not shown) which switches in turn signal the machine control that the requisite number of stacks of cans has been accumulated at the pick-up position 16.

As soon as the machine control determines that the requisite number of stacks of cans is at the pick-up position, the entrance gate 19 closes to preclude further stacks of cans from entering the pick-up position. The machine control then checks to make sure that the pallet has sequenced forward and is in place as indicated by a limit switch (not shown) at the pallet conveyor 34.

The pick-up sequence then begins with the hold-down motor 114 activated to turn crankshaft 108 and to lower hold-down bars 28 onto the tops of the cans (FIG. 3). Subsequently, the lift frame 68 on the carriage 20 descends by means of cylinder 84 extending under power carrying the lift plate with it. Simultaneously, actuators 46 are deflated so that the can guide 44 retracts as the lift plate 26 descends on top of it. As a result, the lift plate 26 and the can guide 44 are in the positions shown in FIG. 7a.

The cylinder 84 which controls the descent of the lift frame 68 and therefore the descent of the lift plate 26 was extended with a power stroke so that the lift plate could engage the can guide and be sure that it was pushed down out of the way for the subsequent pick-up operation. After the lift frame, the lift plate and the can guide have reached the position shown in FIG. 7a, cylinder 100 retracts under power to force lift plate 26 to extend beneath the can as shown in FIG. 7b.

Once the lift plate has extended, the lift frame 68 ascends carrying the lift plate and the can stacks with it. Simultaneously, the can guide 44 also ascends so that the lift plate and the can guide are in the positions shown in FIG. 7c.

As the can guide ascends, it activates a limit switch (not shown) on the frame of the palletizer which opens exit gate 18. Exit gate 18 is equipped with a safety limit switch (not shown) which assures that the exit gate is in fact open before motor 66 begins driving pinion 64 and thus moving the carriage 20 past the open exit gate toward deposit position 30.

When the carriage 20 reaches deposit position 30 a limit switch (not shown) mounted adjacent the deposit position is activated which in turn stops motor 66 and starts the deposit sequence. At the same time the limit switch closes exit gate 18 and opens entrance gate 19 so cans may begin accumulating at pick-up position 16 while the deposit sequence is being carried out.

The deposit sequence first causes the lift frame to descend without power to cylinder 84. The reason that power is not applied to lower the lift frame is that the weight of the cans is sufficient to cause the lift frame to lower. Moreover, because the pallets may be of varying height, a power stroke by cylinder 84 in lowering the lift frame might cause the lift plate to crush the pallet. As soon as the lift plate has descended, motor 114 rotates in reverse causing crankshaft 108 to turn in a counterclockwise direction (from 4 o'clock to 8 o'clock) thereby causing hold-down bars 28 to ascend. After the hold-down bars 28 have ascended, the push bar 102 is extended forward by cylinders 104 while the lift plate 26 retracts. The push-bar 102 in addition to pushing the cans off of the retracting lift plate 26 also pushes the cans along the pallet to snug them up against the cans that have been previously deposited on the pallet. After the push bar has completed its forward stroke and has retracted, the lift frame under control of cylinder 84 ascends, and the motor 66 begins turning in the opposite direction to drive the pinion gear and the carriage back toward the pick-up position.

The can guide is in its up position during the deposit sequence while stacks of cans are being accumulated to assure that the accumulated cans are aligned so as not to be hit by the lift plate as the carriage returns to the pick-up position.

When the carriage reaches the pick-up position, a limit switch (not shown) mounted adjacent the pick-up position is activated which stops motor 66, selects the pick-up sequence, and causes the pallet to increment forward. The palletizer is now in its initial position awaiting the accumulation of the requisite number of stacks of cans so that the palletizing sequence may begin again.

As mentioned before, it is possible to use the palletizer disclosed to stack the cans in a staggered fashion—a row of four cans, followed by a row of three cans, followed by a row of four cans, etc. Palletizing the row containing four cans is carried out in the manner described above. In order to stack the next row of three cans, it is necessary simply to provide a counter in the machine control to select three stacks of cans at the pick-up position instead of four stacks of cans. Once three stacks of cans have been accumulated, the pick-up sequence is the same as before. The only other alteration in the palletizing sequence is to provide a second limit switch at the deposit position, which when selected, stops the carriage the radius of one can sooner than for the four stack sequence. The machine control then simply selects the three can pick-up and deposit sequence followed by a four can pick-up and deposit sequence followed by a three can pick-up and deposit sequence and so forth until the pallet is full.

I claim as my invention:

1. A palletizer for moving a plurality of stacked cans from a first pick-up position on a can conveyor to a second deposit position on a pallet carried by an indexing pallet conveyor comprising:

(a) accumulator means for accumulating the stacked cans at the first pick-up position on the can conveyor;

(b) carriage means mounted on a frame and operable to move from the first pick-up position to the second deposit position, the carriage means including:

(1) lift means including a lift frame mounted on the carriage means for vertical movement and a lift plate mounted on the lift frame for horizontal movement, wherein the lift plate and the lift frame cooperate to engage and lift the stacked cans by means of the lift plate moving horizontally under the cans and the lift frame, carrying the lift plate, moving upward to lift the cans off of the can conveyor; and (2) hold-down means for engaging the tops of the accumulated stacked cans and for stabilizing the stacked cans when the cans are lifted by the lift means and while the carriage means moves from the first pick-up position to the second deposit position; and (c) can guide means adjacent the can conveyor for aligning the stacked cans on the can conveyor prior to the engagement of the bottom of the cans by the lift plate of the lift means to assure adequate engagement for lifting.

2. The palletizer of claim 1 wherein the can guide includes actuator means for retracting the can guide in synchronization with the lift plate to provide clearance so that the lift plate can move horizontally under the aligned bottoms of the stacked cans prior to the lift means lifting the cans.

3. The palletizer of claim 2 wherein the actuator means comprises two pneumatic actuators connected to each end of the can guide means for providing equalized support for the can guide means prior to the can guide means being retracted.

4. A palletizer for moving a plurality of stacked cans from a first pick-up position on a can conveyor to a second deposit position on a pallet carried by an indexing pallet conveyor comprising:

(a) accumulator means for accumulating the stacked cans at the first pick-up position on the can conveyor;

(b) carriage means mounted on a frame and operable to move from the first pick-up position to the second deposit position, the carriage means including:
(1) lift means for engaging the bottoms of the accumulated stacked cans and for lifting the cans off of the can conveyor; and
(2) hold-down means comprising a plurality of hold-down bars each having a first end connected to an eccentric, an intermediate portion supported by a loose fulcrum and a second end for engaging the tops of the cans in conjunction with lifting of the lift means so that the stacked cans are stabilized when the cans are lifted by the lift means and while the carriage means moves from the first pick-up position to the second deposit position.

5. The palletizer of claim 4 wherein the second end of each hold-down bar includes finger means which in cooperation with the eccentric and loose fulcrum engage the can tops and pull the cans toward the carriage means when the eccentric is operated.

6. A palletizer for moving a plurality of stacked cans from a first pick-up position on a can conveyor to a second deposit position on a pallet carried by an indexing pallet conveyor comprising:

(a) an accumulator means including an exit gate means for arresting the movement of the cans on the can conveyor thereby causing the can conveyor to slide under the accumulator cans resulting in the accumulation of stacked cans at the first pick-up position on the can conveyor;

(b) carriage means mounted on a frame and operable to move from the first pick-up position to the second deposit position, the carriage means including:
(1) lift means for engaging the bottoms of the accumulated stacked cans and for lifting the cans off of the can conveyor; and
(2) hold-down means for engaging the tops of the accumulated stacked cans and for stabilizing the stacked cans when the cans are lifted by the lift means and while the carriage means moves from the first pick-up position to the second deposit position.

7. The palletizer of claim 6 wherein the exit gate includes safety interlock means to assure that the exit gate is opened before the carriage begins movement from the first pick-up position to the second deposit position.

8. The palletizer of claim 6 wherein the accumulator means further includes entry gate means and counting means, the counting means operable to count the number of stacks of cans carried into the accumulator means by the can conveyor and operable to close the entry gate means so as to limit the number of can stacks to a predetermined number.

* * * * *

UNITED STATES PATENT AND TRADEMARK OFFICE
CERTIFICATE OF CORRECTION

PATENT NO. : 4,197,046
DATED : April 8, 1980
INVENTOR(S) : Harvey T. Shank

It is certified that error appears in the above-identified patent and that said Letters Patent are hereby corrected as shown below:

Col. 2, line 48 - delete "5,"

Signed and Sealed this

Twenty-ninth Day of September 1981

[SEAL]

*Attest:*

*Attesting Officer*

GERALD J. MOSSINGHOFF

*Commissioner of Patents and Trademarks*